United States Patent [19]

Faxvog et al.

[11] Patent Number: 4,601,036
[45] Date of Patent: Jul. 15, 1986

[54] RAPIDLY TUNABLE LASER

[75] Inventors: Frederick R. Faxvog, Plymouth; Hans W. Mocker, Minneapolis, both of Minn.

[73] Assignee: Honeywell Inc., Minneapolis, Minn.

[21] Appl. No.: 431,930

[22] Filed: Sep. 30, 1982

[51] Int. Cl.⁴ .............................................. H01S 3/10
[52] U.S. Cl. ................................... 372/20; 372/108; 372/102; 372/9; 372/16; 372/19
[58] Field of Search ...................... 372/10, 15, 19, 20, 372/102, 25; 378/98, 93, 92, 99, 108, 16

[56] References Cited

U.S. PATENT DOCUMENTS 3,609,588  9/1971  McKnight ............................. 372/15
4,513,422  4/1985  Buholz ................................. 372/32

OTHER PUBLICATIONS

Osgood, Jr. et al.; "Q-Switching of the Carbon Monoxide Laser", Appl. Phys. Lett., vol. 15, No. 2, Jul. 15, 1969.
Kitazima; "Relaxation–Time Measurement of $CO_2$ Laser by Q-Switching Technique"; J. Appl. Phys., vol. 45, No. 11, Nov. 74.
Lee et al.; "Use of a Tunable Q-Switched, Pulsed-Discharge $CO_2$ Laser to Study Indiv. Rotational Comp."; Optics Comm., vol 1, No. 6, 1970.
Day et al.; "Investigation of a Q-Switched Pulsed Discharge $CO_2$ Laser", IEEE JQE, vol. 5; Aug. 1969; p. 423.

Primary Examiner—Leon Scott, Jr.
Attorney, Agent, or Firm—William T. Udseth

[57] ABSTRACT

Method and means are disclosed for rapidly tuning a laser over a large number of wavelengths. The means of the present invention includes first and second reflecting means which define the optical resonating cavity of a laser, and further includes a dispersive means adapted to sequentially select and direct one and only one of the wavelengths of light from the beam emitted by a laser's amplifying medium along a path back through the laser's amplifying medium as one of the reflecting means is continuously rotated. One embodiment of the present invention forms the rotating reflecting means as a faceted polygonal solid with at least one face thereof being a Littrow reflective grating. A pulsed laser is adapted to tune to a different wavelength of light each time some or all of the grating faces of the polygonal solid are rotated to intercept the longitudinal axis of the laser. A second embodiment forms the rotating reflecting means from a faceted polygonal solid but reflects laser light from the rotating reflected means to a single stationary Littrow grating. A third embodiment provides means and method of producing pairs of output pulses where the pair members are separated by a short time interval.

16 Claims, 8 Drawing Figures

RAPIDLY TUNABLE LASER

BACKGROUND OF THE INVENTION

1. FIELD OF THE INVENTION

The present invention relates to rapidly tunable lasers in Littrow configuration, and particularly to pulsed lasers of this type.

2. PRIOR ART

Plane and concave reflective gratings in Littrow configuration are mounted so that the surface thereof intercepts the optical axis of a spectrograph or laser. In combination with a laser, the surface of a grating is placed at various angles to the optic axis so that different wavelengths of incident light will be reflected along the laser's optic axis. The particular wavelength $\lambda$ reflected is determined by the formula:

$$k\lambda = a \sin \theta \quad (1)$$

where a is the grating element spacing, $\theta$ is the angle of incidence of the laser light relative to the grating normal, and K is a whole number determined by the order employed.

Gratings mounted for rotation so that $\theta$ can be varied to thereby select various wavelengths and tune the laser, are disclosed in the prior art. Four U.S. patents provide examples of tunable lasers with Littrow gratings. In U.S. Pat. No. 3,443,243 to Patel, a grating is located beyond the reflective elements defining the optical resonator cavity of a laser and light reflected from the grating passes through an aperture to maximize frequency resolution. The concave reflective grating employed in Patel's device can be rotated about an axis parallel to the grating lines. In U.S. Pat. No. 3,739,295 to Shah, a rotatable plane reflective grating is employed as a tuning element in a dye laser. An aperture is included between the grating and one of the resonator cavity reflector elements to block fluorescence of radiation returning from the grating to the lasing medium. In a patent to Comera et al, U.S. Pat. No. 4,241,318, a laser's plane reflector grating is adapted, in combination with a wheel containing two optical elements, to place the optical elements periodically in the path of the laser beam. This deflects the laser beam so that the angle of incidence of the beam on the grating is modified and a different wavelength is reflected back along the longitudinal axis of the laser for each element. The grating and wheel are rotatable as a unit relative to a plane perpendicular to the longitudinal axis of the laser so that more than two wavelengths can be selected.

An embodiment shown in FIG. 9 of U.S. Pat No. 4,287,486 to Javan discloses a double grating arrangement with the gratings facing each other, albeit offset and not parallel, so different wavelengths of light from the laser are dispersed onto a mirror. The mirror is rotated to sequentially regenerate only one of a series of wavelengths at a time. The laser is triggered to fire when light of the first wavelength strikes the mirror in perpendicular relationship, with the pulse continuing until all the wavelengths of interest are scanned. Thus a chirped pulse (i.e. a pulse with a change in wavelength within the pulse) is provided. Javan however, does not disclose a pulsed laser wherein each pulse can be tuned to a different wavelength, particularly if very fast switching times are desired.

In "CO2 Probe Laser with Rapid Wavelength Switching", S. Holly and S. Aiken, SPIE Volume 122, Advances in Laser Engineering (1977), rapid tuning of a continuous wave CO2 probe laser is provided by positioning eight gratings in carousel fashion about a mirror mounted on a scanner, stepping motor apparatus. The eight gratings are switched in sequence into the optical cavity of the probe laser. Switching between wavelengths was reported to occur within approximately 10 milliseconds. The number of wavelengths which can be scanned by the Holly and Aiken device is limited by the number of gratings provided and the alignment problems require a complex electro optics control loop system.

Not found in the prior art is a relatively simple system for rapidlly scanning (i.e. on the order of 10 milliseconds or less) dozens or even one hundred wavelengths from a single laser source. Such a system would be particularly useful in spectroscopic measurements both in diagnostic laboratory experiments, remote sensing systems for pollutants and toxic gases, and in certain laser weapon systems.

SUMMARY OF THE INVENTION

The present invention discloses a laser having first and second reflecting means which define the optical resonating cavity, and including a dispersive means adapted to sequentially select and direct various wavelengths of light from the light emitted by the laser's amplifying medium individually along a path back through the laser's amplifying medium as one of the reflecting means is continuously rotated.

In the preferred embodiment, a regular polygonal solid with all faces substantially totally reflective is rotated continuously about its central axis and is adapted to sequentially reflect one and only one wavelength of light from a face as it rotates. A pulsed amplifying medium is used in conjunction with the polygonal solid with the pulses time delayed so that the light pulse emitted by the amplifying medium is incident on various faces of the polygonal solid at a different angle of incidence each time the laser is pulsed. The various angles of incidence are selected so that one and only one of the wavelengths included in the light emitted by the amplifying medium are directed down the longitudinal axis of the laser. The faces of the polygonal solid can themselves be gratings in a Littrow configuration or they can be adapted to reflect the laser beam onto a single grating in the Littrow configuration.

A method of rapidly tuning a laser over large numbers of wavelengths is also disclosed.

Method and means of a dual pulse scheme with pairs of pulses separated by small time intervals is further disclosed.

DESCRIPTION OF THE PREFFERED EMBODIMENT

Figure 1:
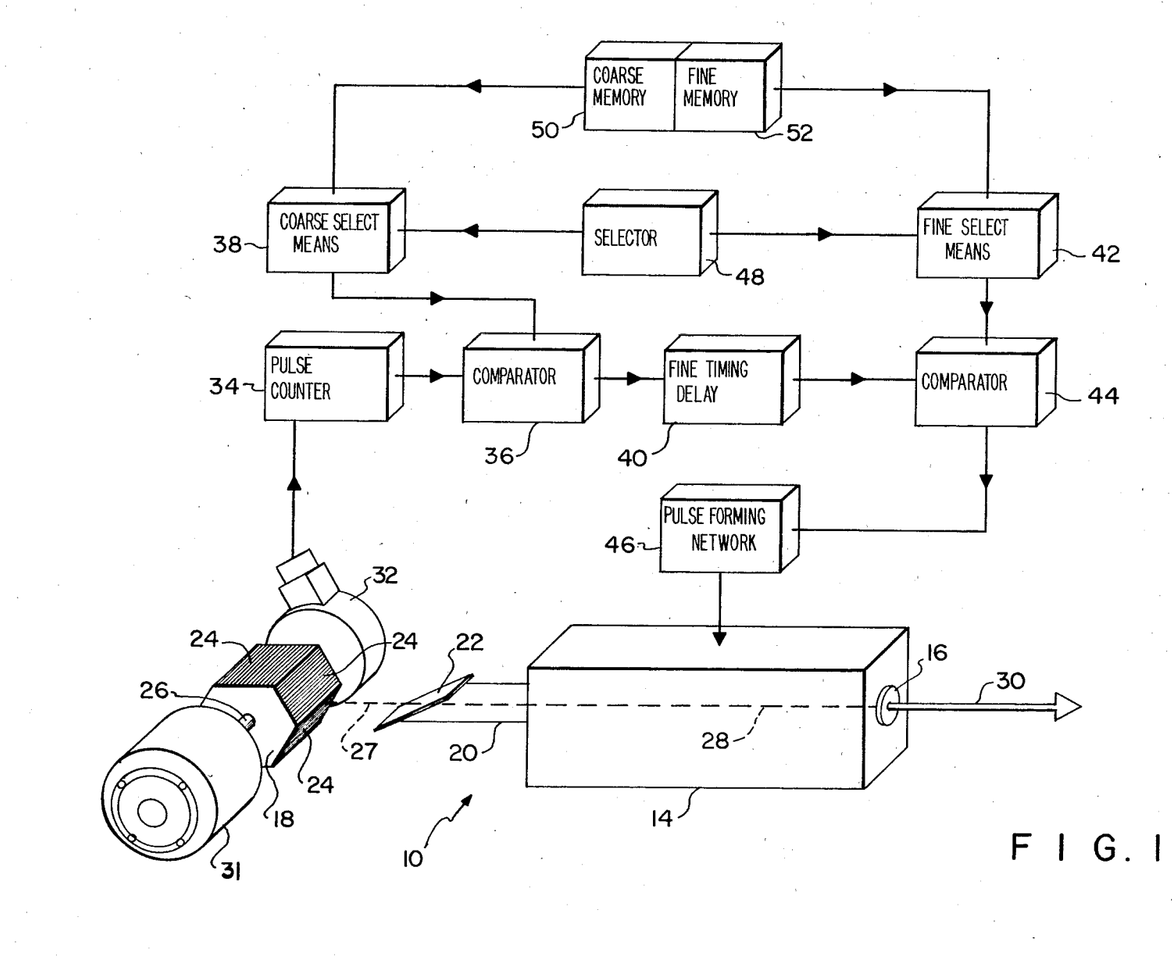
FIG. 1 is a schematic of a pulsed CO2 TEA laser constructed in accordance with the present invention.

FIG. 1 depicts the first embodiment 10 of the present invention. Therein a laser 12, e.g. a CO2 TEA laser, includes a gain medium section 14, a partially reflecting means 16 (e.g. a partially reflecting plane mirror) and a substantially totally reflecting means 18. Reflecting means 16 and 18 form the resonant cavity for laser 12. Gain medium 14 of the CO2 TEA laser is CO2 (and other gases such as N2, CO, Xe, He, etc.) and is confined in plasma tube 20 which is capped by Brewster window 22 set at Brewster's angle to totally transmit only light of a selected direction of linear polarization to reflecting means 18.

Reflecting means 18 is preferably a solid of uniform polyonal cross section with each face 24 thereof being identical and intersecting adjacent faces at the same angle. Reflecting means 18 has a central axis coincident with shaft 26. A hexagonal cross section is convenient and is shown in FIG. 1. Faces 24 can be reflective gratings, i.e. in the Littrow configuration. As described above, by varying the angle of incidence of light beam 27 from laser 12, various wavelengths of light in beam 27 can be individually selected to propagate along the longitudinal or oscillatory axis 28 of laser 12. When an integral number of half wavelengths of light so selected equals the resonator cavity length, an output laser beam 30 is produced.

Figure 3:
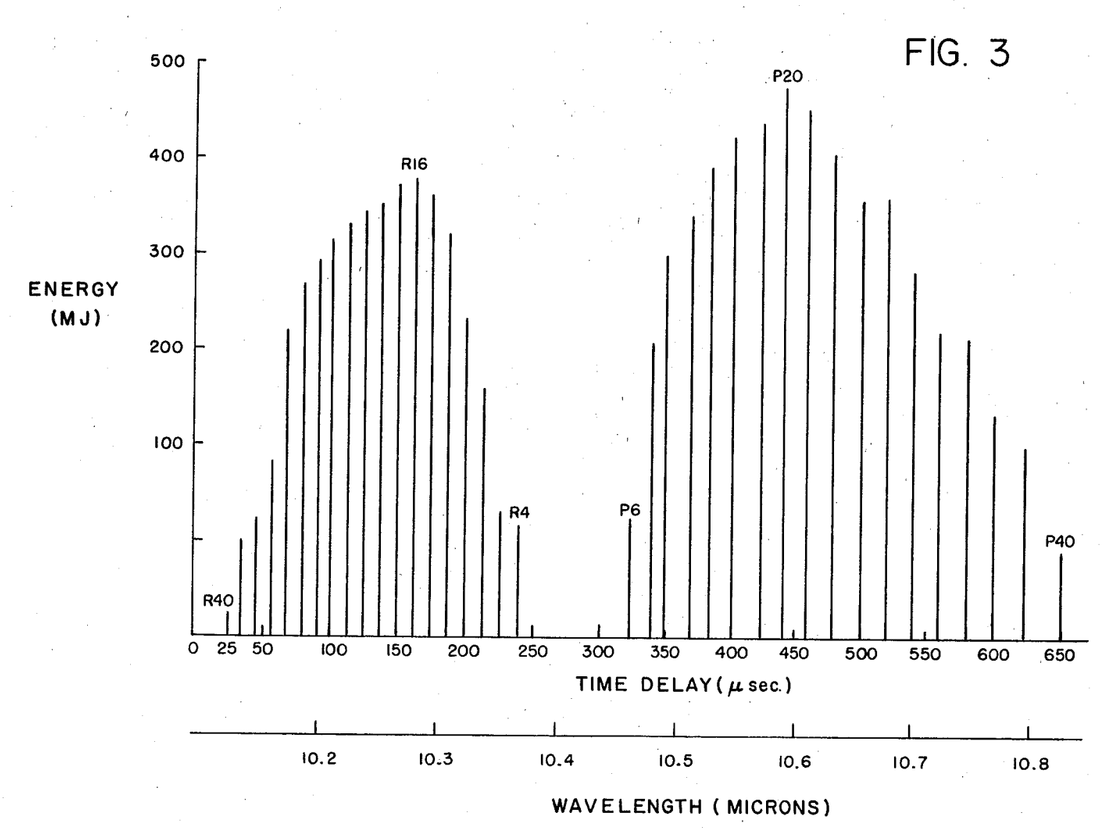
FIG. 3 is output data obtained from a modified device of FIG. 1 incorporating the structure of FIG. 3.

For CO2, when gain medium 14 is excited, it is possible to operate the laser on more than over 70 wavelengths of light emitted in beam 27 due to the numerous rotational energy sublevels of the three vibrational energy levels of the CO2 molecule. These wavelengths appear in the R and P branches of the 9 and 10 micron wavelength bands of the CO2 spectra. The 10 micron band is shown in FIG. 3.

A synchronous motor 31 is adapted to rotate reflecting means 18 about shaft 26. Shaft 26 extends to angle encoder 32 (see FIG. 2) wherein the angular position of faces 24 is determined relative to a reference plane parallel to shaft 26.

Ideally laser 12 will be adapted to pulse during the time each new face 24 of reflecting means 18 is intercepted by axis 28. Preferably each face 24 is identical, laser 12 will pulse at such times and beam 27 will strike faces 24 at various angles which are selected to reflect one and only one of the wavelengths of light emitted by beam 27 back along axis 28. Thus, if 70 wavelengths are of interest, it is preferable that 70 different angles of incidence of beam 27 on the faces 24 of reflecting means 18 (i.e. $\theta$ from equation 1) be selected such that the 70 wavelengths of interest will be sequentially and individually reflected along axis 28 each time a new face 24 is in the proper position with respect to axis 28.

An example of electronics suitable for scanning a sequence of wavelengths is depicted in block form in FIG. 1. Angle encoder 32 is designed to work in conjunction with pulse counter 34. Angle encoder 32, for example, may contain a circular plate (not shown) with 1,000 equally spaced marks on one side of the plate and adjacent its periphery. Such plate would turn in unison with reflecting means 18. Additionally, a reference mark could be placed on the plate or one of the 1000 spaced marks could be adapted to be distinguishable from the other marks. Counter 34 is adapted to reset to zero when the reference mark is turned to pass a mark sensing means (not shown) contained in counter 34. Thereafter, counter 34 will count marks and comparator 36 will compare the total to a first number ($\Delta 1$). $\Delta 1$ corresponds to a first wavelength ($\lambda 1$) of interest and $\Delta 1$ is stored in coarse select memory location 38. When the count of counter 34 equals $\Delta 1$, the fine timing delay 40 is enabled by a signal from comparator 36. Fine timing delay 40 will delay an output signal therefrom for a time determined by a first delay time (T1) corresponding to wavelength $\lambda 1$ and stored in fine select memory location 42. A second comparator 44 will compare T1 with the time period since the enable signal was given to fine timing delay 40, and when T1 equals this period, comparator 44 will trigger pulse forming network 46 of laser 12.

For a particular laser 12, there will be a particular further delay between triggering pulse forming network 46 and the onset of oscillation of laser 12. To compensate for this, fine delay times (T1,2,3, ... n) are stored in fine select memory 42 to insure that laser 12 will fire only at the required times.

The fine delay times Tn are selected so that the laser can fire at angular positions of angle encoder 32 (and faces 24) which lie between two of the 1,000 reference marks. This allows fine selection of the angle of incidence of beam 27 on faces 24. Of course, since there is an inherent time delay in device 10 between the recognition by device 10 of the angular position of faces 24 and the firing of laser 12 so that beam 27 is incident on faces 24 at the correct angles $\theta 1,2,3, \ldots n$, the electronics of device 10 must be adapted to signal laser 12 to fire before reflecting means 19 is in the angular position determined by equation 1 to correspond to a particular wavelength. That is, the rotational speed of reflecting means 18 must be taken into account in determining the firing time of laser 12.

The electronics of FIG. 1 shows further preferred features. Selector means 48 can be adapted to automatically instruct coarse selecting means 38 and fine selecting means 42 to sequentially select and store the various n and Tn values contained in course memory 50 and fine memory 52, respectively. Preferably selector means 48 will instruct course selector means 38 and fine selector means 42 to increment the location of the data retrieved from memories 50 and 52 after each firing of laser pulse 12. Of course the electronics of FIG. 1 could be implemented on a microprocessor. Further, a selector means 48 is preferably reprogrammable to allow various patterns of wavelengths contained in beam 27 to be selected, i.e. a random select capability is included.

Of particular advantage in device 10 is a reflecting means 18 which has a constant angular speed about shaft 26. This simplifies accurate determination of the angular position of faces 24 at all times, particularly if the angle encoder 32 employs reference marks to determine angular position and the angular position of interest lies between two such marks.

Figure 2:
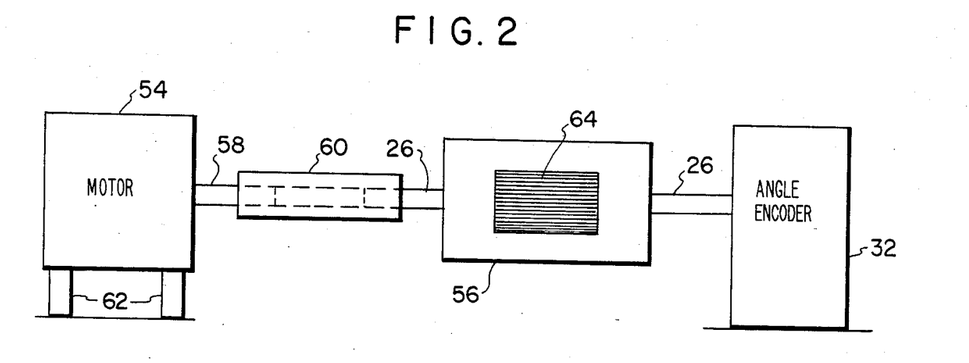
FIG. 2 is a schematic of that portion of FIG. 1 including a synchronous motor and a modified rotatable grating.

FIG. 2 depicts a portion of a device in accordance with the present invention (from which the data in FIG. 3 was obtained) wherein a substantially constant angular velocity of rotation of reflecting means 18 was realized. Therein, a hysteresis synchronous motor 54 (i.e.

Bodine Electric Company model NCH-13) was employed. Motor 54 was coupled to steel cylindrical member 56 by shafts 26 and 58. Shafts 26 and 58 were inserted into sleeve 60. Sleeve 60 was hot rolled steel and extremely soft so that vibrations from motor 54 were damped before they reach shaft 26. Very high quality bearings (i.e. class ABEC NO. 7, not shown) served to support shaft 26 in sleeve 60 in a highly parallel relationship to the earth. Also, a large rotational mass (i.e. several pounds) was included as cylindrical member 56 to minimize the effects of fluctuations in the rotational speed of shaft 58 on the rotational speed of cylindrical member 56. Finally soft mounts 62 were provided under motor 54 to further dampen vibration effects.

Note in FIG. 2 that only one polygonal grating 64 was used. Grating 64 had 130 lines per millimeter. A Tachisto Trac II TEA laser, model 215A was employed as laser 12. The data in FIG. 3 was obtained by manually selecting the course select number $\Delta n$ and the fine time delay Tn for each wavelength $\lambda n$. Encoder 32 was a Teledyne Gurley optical angle encoder, catalog No. 8625-1000-012-10S, pulse counter 34 was a Beckman 6014 preset reversing accumulator, and fine delay clock 40 was a Berkely Nucleonics Corporation model 7055, digital delay generator.

Figure 4:
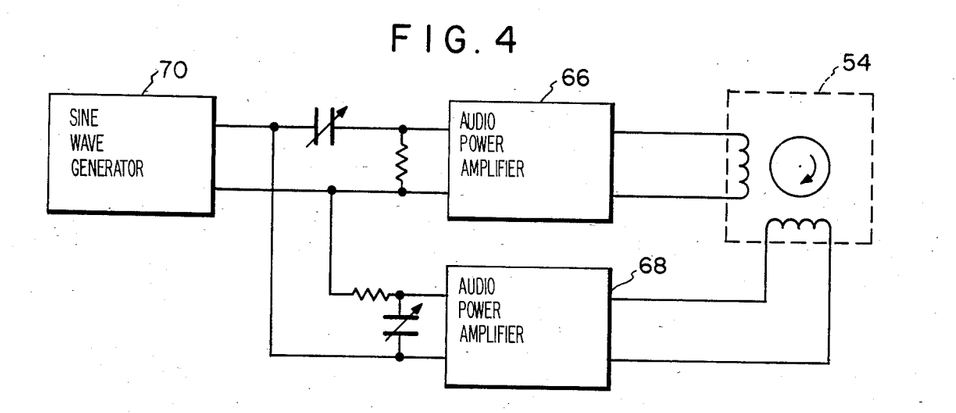
FIG. 4 is a schematic of the electrical drive for the synchronous motor of FIG. 1.

The electrical drive for motor 54 used to obtain the data in FIG. 3 is shown in FIG. 4. Therein, audio power amplifiers 66 and 68 (i.e. McIntosh MC-60S) were driven by sine wave generator 70 (i.e. a Hewlett Packard 208A test oscillator) to turn motor 54 at 1,000 rpms.

The data of FIG. 3 demonstrates that device 10 can indeed tune between $CO_2$ rotational level lines at 10 milliseconds or less. The variation in angle of incidence of beam 27 $\theta$ on grating 64 necessary to scan the P and R branches of the nine and ten micron bands of the $CO_2$ TEA laser was less than nine degrees. Cylindricl member 56 had two oppositedly disposed flat portions (not shown) formed on its surface with grating 64 placed on one flat surface and a balancing plate placed on the opposite surface.

A very small chirp is introduced in the TEA laser pulse due to varying positions of faces 24 during the incidence thereon of the pulses of beam 27. However, the pulse duration is very short (i.e. on the order of 70 nanoseconds for a TEA laser) compared to the angular speed of reflecting means 18, so that generally measurements employing device 10 will not be affected. Although, for specific applications additional electronics may be required. The chirp is estimated to be on the order of 5 MHZ/ $\mu$sec for the data in FIG. 3. Grating 64 with 130 lines per millimeter allowed output pulse shapes for the data in FIG. 3 to overlap somewhat with adjacent pulses, however the individual pulse shapes were well behaved. Higher resolution gratings could be employed to further separate adjacent output pulses.

Figure 5:
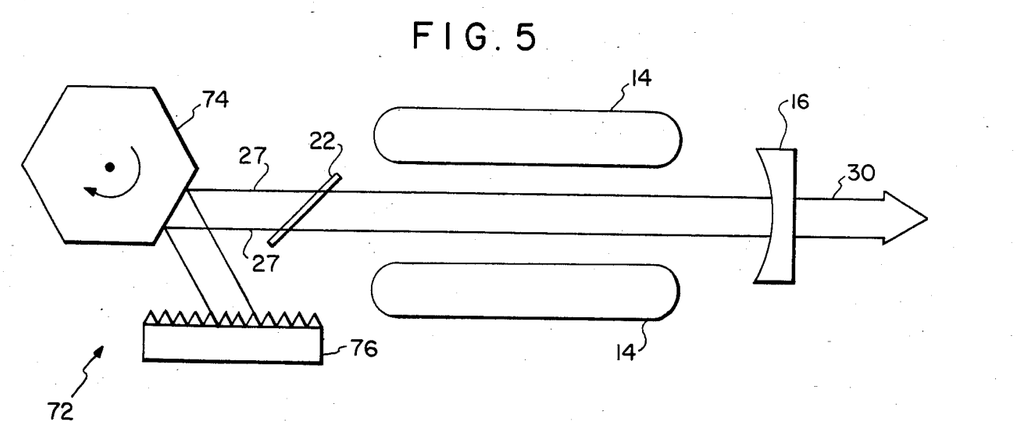
FIG. 5 is a schematic of an alternative embodiment of the present invention.

An alternative embodiment of the present invention is shown as device 72 in FIG. 5. Corresponding structure between devices 10 and 66 are numbered the same for clarity. The alternative feature of device 72 is the use of a polygonal, substantially totally reflecting mirror 74 in combination with a separate grating 76 in place of reflecting means 18. Now grating 76 is simplified in that it is stationary. Device 72 is likely to be significantly less expensive than device 10 and polygonal mirror with high angular tolerances between mirror facets are commercially available.

Figure 6:
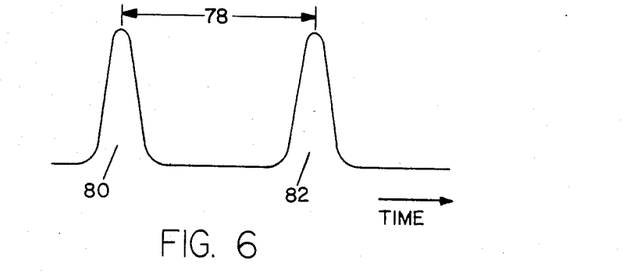
FIG. 6 is a plot of output intensity versus time for two output pulses separated by a short time interval.

For remote sensing applications it is advantageous to emit a pulse pair (pulses 80 and 82 in FIG. 6) on two different wavelengths with a pulse spacing 78 of 100 $\mu$sec or less. One of the two pulses 80 and 82 represent a reference wavelength and the other pulse is a probing pulse with a wavelength that is tunable to $\lambda,1,2,3, \ldots$ n. The pulses are of equal intensity.

Figure 7:
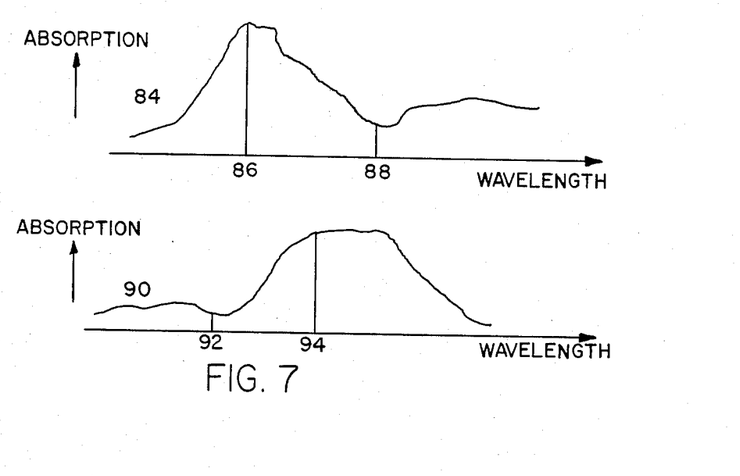
FIG. 7 includes two plots of absorption versus wavelength for two different gases to be identified by a dual pulse device.

The purpose of this dual pulse scheme is explained with reference to FIG. 7. First and second gaseous pollutants with absorption profile 84 and 90, respectively, are under investigation. The pollutants are irradiated with first and second pulses (100 $\mu$sec or less apart) at wavelengths 86 and 88. Wavelength 88 is chosen to be relatively unaffected by absorption and scattering by the first gas whereas wavelength 86 is chosen to be strongly affected. The optical intensity at wavelengths 86 and 88 is measured after the first and second pulses pass through the first medium. The ratio of these two signals is characteristic of the first pollutant. Thus the presence of the first pollutant in an unknown gas can be easily determined by this method. Similarly, the second pollutant can be sensed by employing pulses at wavelengths 92 and 94. The probe and reference pulses are preferrably 100 $\mu$sec or less apart to insure that the gas under investigation is "frozen" between pulses so that the same atmospheric conditions are encountered by both pulses. Atmospheric events, such as turbulence, typically fluctuate with a frequency of 100 Hertz.

Figure 8:
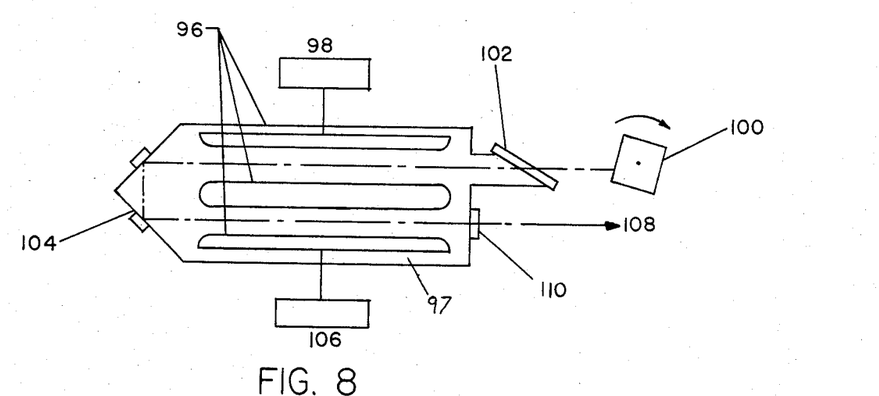
FIG. 8 is a schematic of a dual pulse device in accordance with the present invention.

One device for implementating the dual pulse scheme is shown in FIG. 8. Two pairs of Rogowsky electrodes 96 are used in TEA laser 97 since two pulses in rapid succession cannot be generated in one TEA gain section. This limitation is due to the high degree of ionization from the first discharge and the resultant arc for the second discharge which prevents uniform excitation of the gas in the TEA laser. In practice TEA-lasers are limited to a repetition frequency of 100 Hz to 1000 Hz depending on the gas flow rate.

In FIG. 8 the two pairs of electrodes 96 are provided by a folded resonator configuration. The generation of the pulse pair is then achieved by triggering both pulse forming networks 98 and 106 with a specific delay time which corresponds to the wavelength separation of the two emitted lines. This is achieved in a similar fashion as described in the tuning of a single laser output pulse. In this case, however, two wavelengths (one reference and one probe) would be emitted per grating face of grating 100. Oscillation in laser 97 will occur along the dashed line in FIG. 8. Brewster window 102 helps to confine the gas within laser 97 and corner reflector 104 directs the output beam 108 through partially reflecting mirror 110.

What is claimed is:
1. A rapidly tunable laser, comprising:
first and second means for at least partially reflecting light, wherein said second reflecting means is continuously rotated about a first axis and said first and second reflecting means define an optical cavitiy;
a medium in said optical cavity which is capable of lasing at a plurality of light wavelengths along a second axis between said first and second reflecting means;
dispersive means for directing various of said wavelengths of light individually along said second axis as said second reflecting means is rotated;
means for exciting said medium to said lasing condition;
means for storing data of possible angular positions, of said second reflecting means relative to said first axis;

means for retrieving selected of said data, wherein said data can be retrieved in any order;

means for determining an angular position of said second reflecting means;

means for comparing said retrieved data to said actual angular position of said second reflecting means; and means for activating said excitation means when said actual angular position of said second reflecting means is included within said retrieved data.

2. The device of claim 1 wherein said second partially reflecting means is rotated at no less than 1,000 revolutions per minute.

3. the laser of claim 1 wherein said first axis is transverse to said second axis.

4. The laser of claim 1 wherein:
said dispersive means includes a grating, said grating being irradiated at various angles by said plurality of light wavelengths as said second reflecting means is rotated.

5. A rapidly tunable laser, comprising:
first means for at least partially reflecting light;
second means for at least partially reflecting light, said second reflecting means being continuously rotated about a first axis, and wherein said first and second partially reflecting means define an optical cavity;
a medium in said optical cavity which is capable of lasing at a plurality of light wavelengths along a second axis between said first and second partially reflecting means;
dispersive means for directing various of said wavelengths of light from a least some of said lasear light pulses, but only one of said wavelengths from any one of said pulses, along said second axis as said second partially reflecting means is rotated;
means for exciting said medium to said lasing condition;
means for storing data of possible angular positions, of said second reflecting means relative to said first axis;
means for programmably retrieving selected of said data, wherein said data can be retrieved in any order;
means for determining an angular position of said second reflecting means;
means for comparing said retrieved data to said actual angular position of said second reflecting means; and
means for activating said excitation means when said actual angular position of said second reflecting means is included within said retrieved data.

6. The device of claim 2 wherein said dispersive means comprises a plurality of gratings formed on the surface of said second partially reflecting means.

7. The device of claim 5 wherein said gratings each have the same number of lines per unit of distance.

8. The device of claim 5 wherein said second partially reflecting means has a cross section taken perpendicular to said first axis, said cross section has a boundary and said boundary is a regular polygon.

9. The device of claim 1 wherein a different one of said wavelengths is directed along said second axis by said dispersive means for each of said lasing pulses for a fixed number of said pulses.

10. the device of claim 5 wherein said laser pulses are generated at least every 10 milliseconds.

11. The device of claim 5 wherein said means for exciting said medium excites substantially separate portions of said medium at different times so that pairs of said light pulses are generated with the time interval between members of said pairs being no more than 100 $\mu$sec.

12. The laser of claim 5 wherein said first axis is transverse to said second axis.

13. The laser of claim 5 wherein:
said dispersive means includes a grating, said grating being irradiated at various angles by said plurality of light wavelengths as said second reflecting means is rotated.

14. A method of rapidly tuning a laser, comprising:
forming an optical cavity between first at least partially reflecting means and second at least partially reflecting means;
providing a medium in said optical cavity which is capable of lasing at a plurality of light wavelengths along a first axis between said first and second reflecting means;
exciting said medium to said lasing condition at selected times;
rotating said first reflecting means continuously about a second axis; and
selecting various of said wavelengths of light individually, and without regard to their spectral order, as said first reflecting means is rotated; and directing said selected wavelengths along said first axis.

15. The method of claim 14 further including;
positioning said first axis transverse to said second axis.

16. The method of claim 14 further including:
irradiating a grating at various angles with said plurality of wavelengths as said first reflecting means is rotated;
determining said angles; and
triggering said excitation means when certain of said angles necessary for the selection of certain of said various wavelengths are indicated by said determing step.

* * * * *

UNITED STATES PATENT AND TRADEMARK OFFICE
CERTIFICATE OF CORRECTION

PATENT NO. : 4,601,036
DATED : JULY 15, 1986
INVENTOR(S) : FREDERICK R. FAXVOG, ET AL.

It is certified that error appears in the above-identified patent and that said Letters Patent is hereby corrected as shown below:

In column 6, line 56, delete "cavitiy" and insert in lieu thereof --cavity--.

In column 7, line 3, insert --actual-- before "angular".

In column 7, line 49, insert --actual-- before "angular".

In column 8, line 1, delete "2" and insert in lieu thereof --5--.

In column 8, line 4, delete "5" and insert in lieu thereof --6--.

UNITED STATES PATENT AND TRADEMARK OFFICE
CERTIFICATE OF CORRECTION

PATENT NO. : 4,601,036
DATED : July 15, 1986
INVENTOR(S) : FREDERICK R. FAXVOG, ET AL.

It is certified that error appears in the above-identified patent and that said Letters Patent is hereby corrected as shown below:

In column 8, line 10, delete "1" and insert in lieu thereof --5--.

Signed and Sealed this

Twenty-seventh Day of January, 1987

*Attest:*

DONALD J. QUIGG

*Attesting Officer*     *Commissioner of Patents and Trademarks*